May 31, 1938.  H. PAXTON  2,119,053
BOX LIDDING AND STAMPING MACHINE
Filed Jan. 4, 1935  4 Sheets-Sheet 1
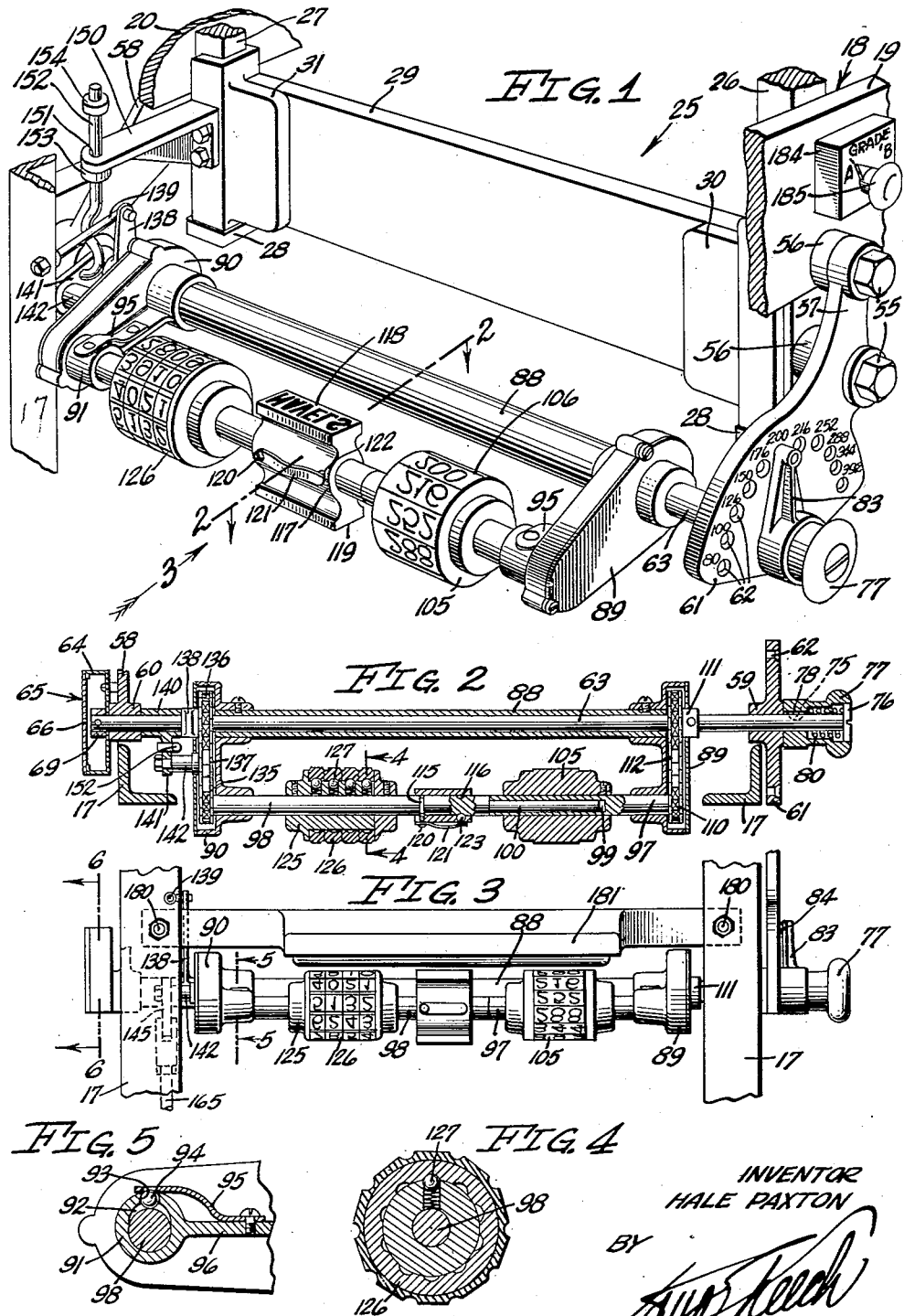
INVENTOR
HALE PAXTON
BY
ATTORNEY

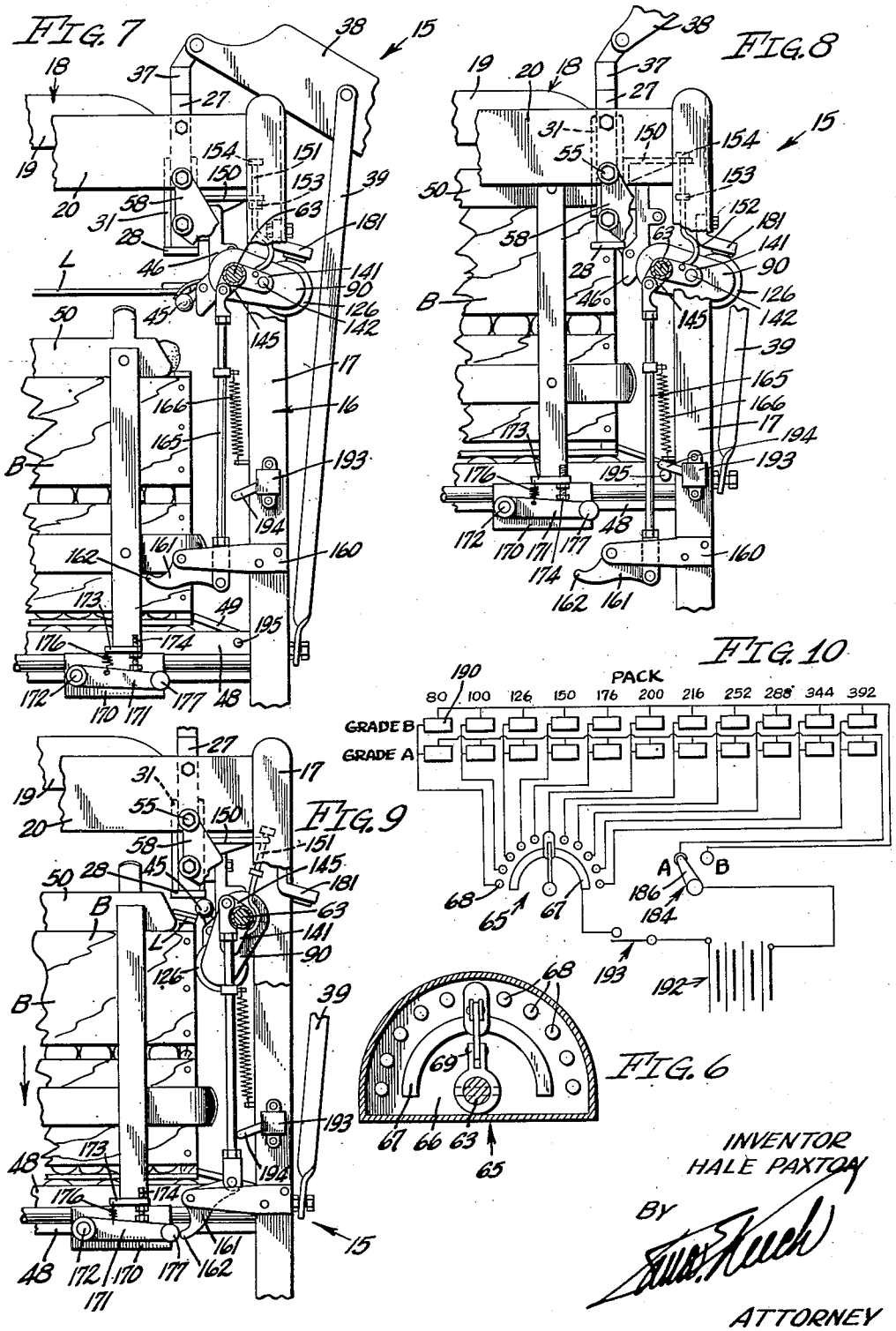

May 31, 1938.   H. PAXTON   2,119,053
BOX LIDDING AND STAMPING MACHINE
Filed Jan. 4, 1935   4 Sheets-Sheet 3

INVENTOR
HALE PAXTON
BY
ATTORNEY.

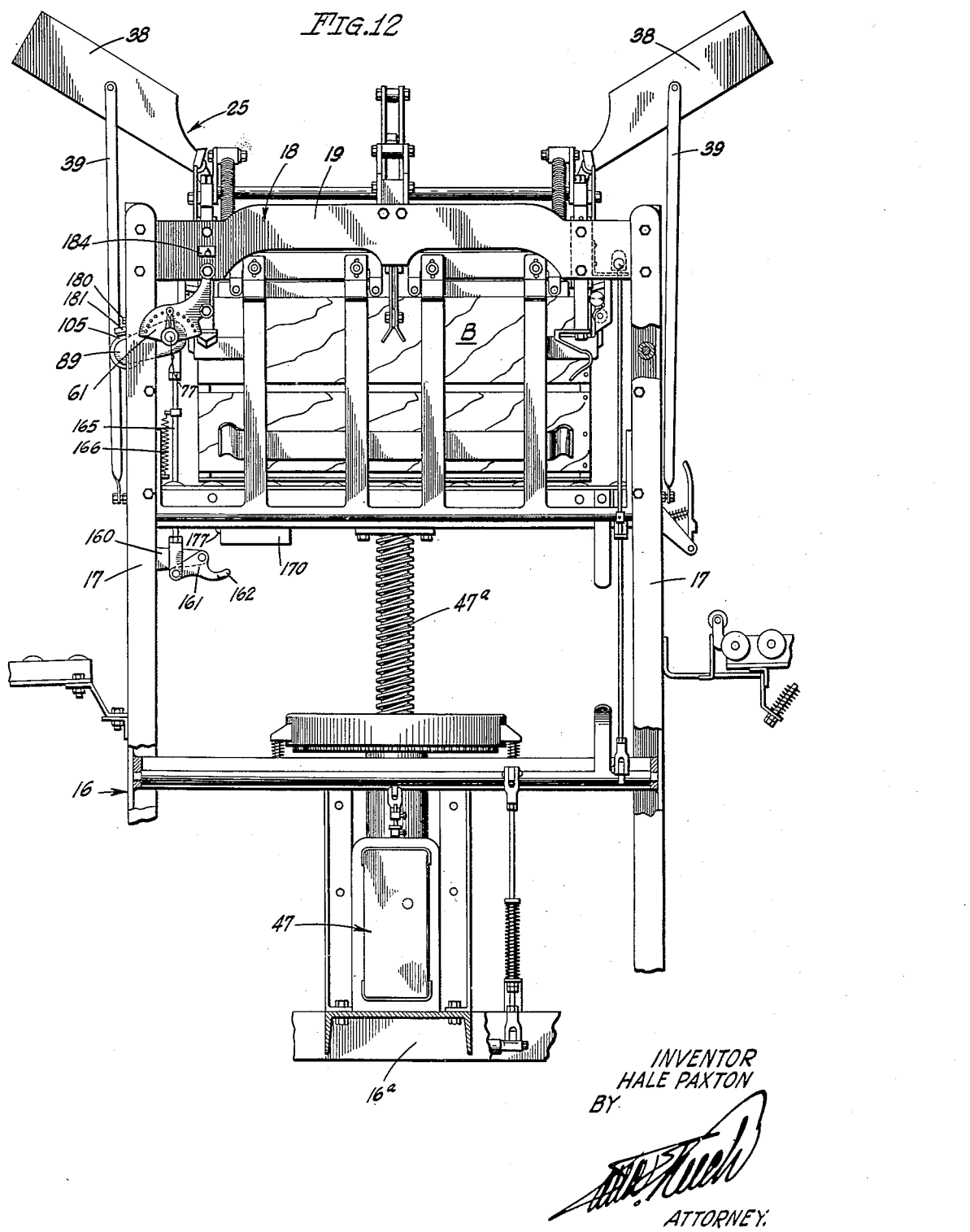

Patented May 31, 1938

2,119,053

UNITED STATES PATENT OFFICE 2,119,053

BOX LIDDING AND STAMPING MACHINE

Hale Paxton, Santa Ana, Calif., assignor, by mesne assignments, to Food Machinery Corporation, a corporation of Delaware Application January 4, 1935, Serial No. 392

22 Claims. (Cl. 101—35)

This invention relates to machines for nailing the lids on boxes packed for shipment and has for its principal object the provision of such a machine which will stamp on each box as it is being lidded certain data regarding the contents of the box. This invention is particularly useful in connection with the lidding of boxes of citrus fruits and the preferred embodiment of the invention disclosed herein has to do with performing that function.

In the citrus industry each lot of fruit delivered to the packing house by each farmer is assigned a lot number and the identity of the fruit in each such lot is maintained till it is completely packed in boxes and these boxes are lidded ready for shipment. In preparing the fruit in each lot for packing, it is sized and in packing each size into a box a specified number of pieces of that size are placed in the box. Each of the sizes into which the fruit is thus divided is known by the number of pieces of that size of fruit which are packed in the standard shipping box. In order to adjust each particular size of fruit to the uniform dimensions of the standard shipping container each such size is packed in a particular geometrical arrangement in the box. Accordingly before the box is lidded it is possible merely by observation of the arrangement of the fruit on the top of each pack to ascertain the size of fruit packed in this box. It is a requirement of the shipping regulations that the index numeral of the size of fruit contained in each box be stamped on the outside thereof.

It has hitherto been the general custom to employ a person in each packing house solely for the purpose of observing the size of fruit in each box as it comes down the conveyor towards the lidding machine and stamp on the exterior of the box the index numeral correctly indicating the size of fruit contained therein.

It is an object of this invention to provide a box lidding and stamping machine which may be operated by a single person and which performs both the lidding of the box and the stamping of data on the exterior of the box regarding the contents thereof.

It is a further object of this invention to provide such a machine, the stamping mechanism of which may be controlled by relatively slight attention on the part of the operator, so that the stamping mechanism will apply to the box indicia correctly denoting the size of fruit contained in the box without interfering with the normal operation of the lidding machine.

In lidding machines, that is, machines which press the cover on the box and nail the cover to the ends of the box, the box rests upon a table and the lid pressing and nailing mechanism is supported on an overhead frame structure and means is provided for causing relative vertical movement between said table and structure to lid the box. As the operator's head is approximately on the level with the above mentioned overhead structure it is yet another object of this invention to provide a box lidding and stamping machine in which the stamping mechanism is provided on the aforesaid overhead structure of the machine where it can be readily controlled by the operator of the machine.

It is a still further object of this invention to provide a box lidding, stamping and counting machine, the correct actuation of which results in recording the number of boxes of fruit of each size in each lot lidded by the machine.

It is yet another object of this invention to provide a box lidding, stamping and counting machine the correct operation of which records not only the number of boxes of fruit of each size in each lot but in each of such groupings separately records the number of boxes containing each of several different grades of fruit.

The manner of accomplishing the foregoing objects as well as further objects and advantages will be made manifest in the following description taken in connection with the accompanying drawings, in which:

Fig. 1 is a fragmentary perspective view of a preferred embodiment of the stamping mechanism of the invention, this view showing the mechanism prior to beginning an operation.

Fig. 2 is a horizontal sectional view taken on the line 2—2 of Fig. 1.

Fig. 3 is an end elevational view of the stamping mechanism taken in the direction of the arrow 3 in Fig. 1.

Fig. 4 is a transverse sectional detailed view taken on the line 4—4 of Fig. 2.

Fig. 5 is a transverse detail sectional view taken on the line 5—5 of Fig. 3.

Fig. 6 is an enlarged detail sectional view taken on the line 6—6 of Fig. 3.

Fig. 7 is a fragmentary rear elevational view partly in section and illustrating the lidding and stamping machine of the invention after a box of fruit has been rolled into the machine prior to commencing the lidding and stamping operation.

Fig. 8 is a view similar to Fig. 7 and illustrates the parts of the machine at the instant the nailing of the lid to the ends of the box is completed.

Fig. 9 is a view similar to Fig. 8 and illustrates the parts of the machine at the instant the printing on the uox by the stamping mechanism takes place.

Fig. 10 is a diagrammatic view illustrating the electric circuit by which the number of boxes of each size and grade lidded in the machine is recorded.

Fig. 12 is a view similar to Fig. 11 showing the elevator table lifted in lid nailing position.

Figure 11:
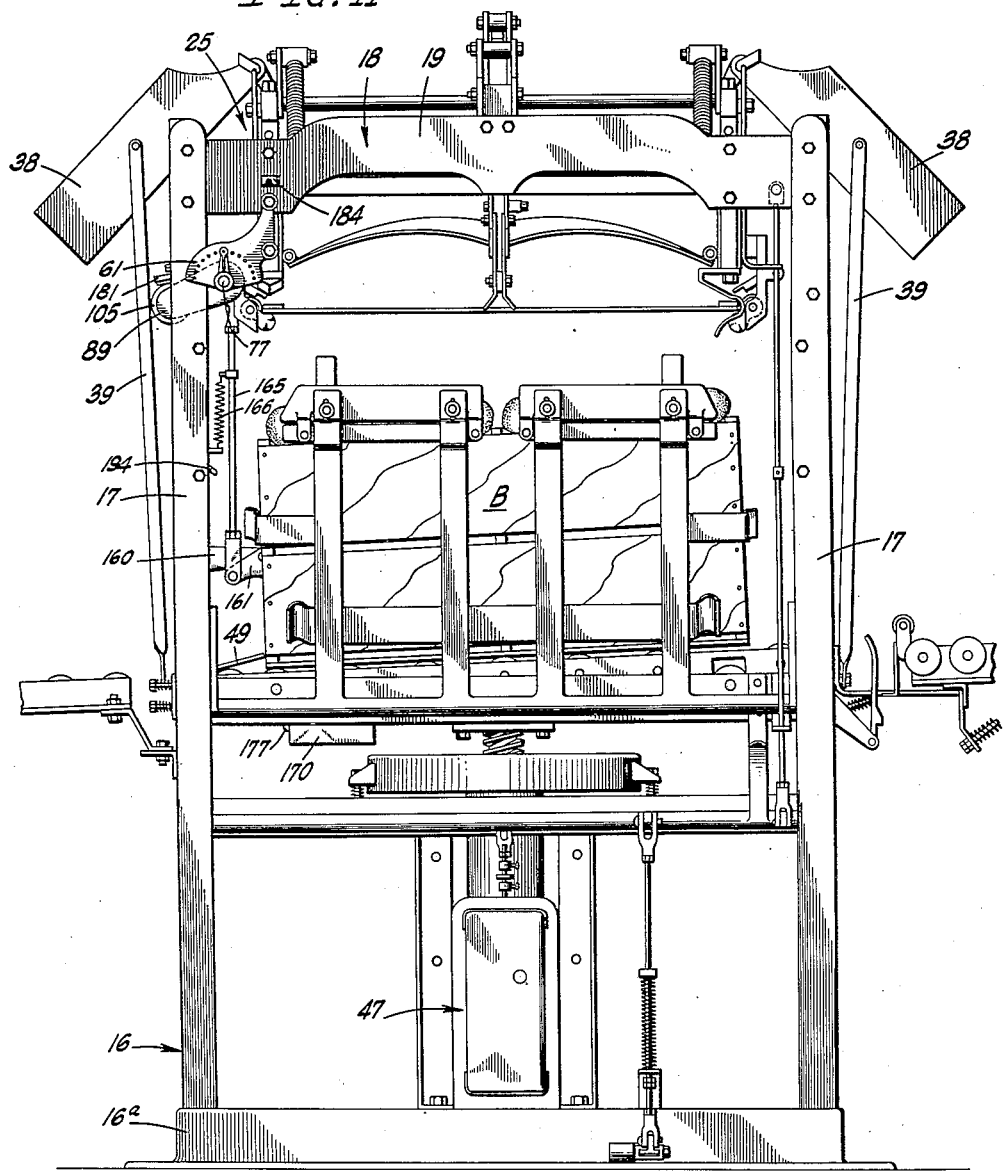
Fig. 11 is a front elevational view of a lid nailing machine embodying my invention.

Referring specifically to the drawings it is first desired to point out that the preferred embodiment of this invention represents an improvement in the automatic lid nailing and strapping machine disclosed in the co-pending application for U. S. Letters Patent, Serial No. 688,104, filed September 5, 1933, in which application I am a joint applicant. For a more complete description of the principal working elements of the machine having to do with the receiving, lidding, and discharge of the box, reference is had to said co-pending application. All of the machine parts shown fragmentarily or diagrammatically and only briefly described herein will be found more fully shown and described in said co-pending case.

The preferred embodiment of the box lidding, stamping and counting machine of the invention is identified in the drawings by the numeral 15. This machine includes a frame 16 having a rectangular base 16a, four corner posts 17, and an overhead structure 18 mounted on and connecting the upper ends of the corner posts 17, the principal members of this structure comprising side plates 19 and 20.

Supported between the overhead side plates 19 and 20 in spaced relation with each other are nailing mechanisms 25 only one of which is shown in the drawings so that reference hereinafter in the description to the nailing mechanism 25 is with the understanding that this refers to the nailing mechanism illustrated. This mechanism includes a pair of side slide bars 26 and 27 which are rigidly secured to inner faces of the overhead side plates 19 and 20. Provided on the lower ends of the slide bars 26 and 27 are chuck beam stops 28. Mounted between the slide bars 26 and 27 is a chuck beam 29 which is diagrammatically shown in Fig. 1 and which carries nailing chucks (not shown) which are utilized in the nailing operation of the machine. Opposite ends of the chuck beams 29 are provided with channeled slides 30 and 31 which embrace and slide on the slide bars 26 and 27 respectively. As shown in Figs. 7 and 8 slide bars 26 and 27 have a cross bar 37 fixed on their upper ends, this cross bar carrying nailing punches (not shown) used in the nailing operation. Pivoted on the cross bar 37 is a nail hopper 38 actuated by an arm 39 so as to deliver nails to the nail chucks aforementioned as being mounted on the chuck beams 29.

As shown in Figs. 7, 8 and 9 an end tucking lid support 45 is pivotally supported on fittings 46 which are fixed upon opposite ends of the chuck beam 29. Elevator mechanism 47 is mounted on the frame of the machine at a central point therein and adjacent the floor. This elevating mechanism includes a vertical screw 47a on the upper end of which is fixed a box supporting table 48 having a stop 49 which automatically positions a box B on the table in readiness for lidding, this stop automatically disengaging the box at the conclusion of the lidding operation. The table 48 also has side flushers 50 which automatically flush the fruit inwardly from over the sides of the box B to prevent injury to the fruit during the lidding operation.

The lidding of box B is accomplished by placing the box in the machine in the position indicated in Fig. 7, placing a lid L in position with its opposite ends resting on the end tucking lid supports 45, and presses on the control pedal, energizing the motor of the elevator mechanism (not shown) so as to lift the table 48 upwardly to the position in which it is shown in Fig. 8. As the table ascends, the fruit in the box B engages the lid L and lifts this bringing its ends upwardly against the nail chucks on the chuck beam 29 until the ends of the lid are pressed downwardly against the ends of the box after which further upward movement of the box lifts the chuck beam 29 so that the stationary nail drivers on the cross bars 31 penetrate the nail chucks and drive the nails disposed therein through the ends of the lid and into the ends of the box. The operator now releases the control pedal of the elevator mechanism this causing the latter to turn the table 48 downwardly to its lowermost position as shown in Fig. 7 and a suitable automatic mechanism (not shown) is provided on the table 48 which ejects the box B from the table.

*Box stamping and counting mechanism*

A description of this mechanism and the manner in which it is associated with the box lidding machine hereinbefore described will now follow.

Fixed by cap screws 55 and spacers 56 to the side plates 19 and 20 and slide bars 26 and 27 are supporting brackets 57 and 58. These brackets (Fig. 2) have bearings 59 and 60 respectively and bracket 57 has a dial 61 provided preferably with eleven detent recesses 62 opposite each of which is a numeral indicating each of the eleven standard sizes of citrus fruit ranging from "80" to "392" as shown in Fig. 1. The detent recesses 62 are of course equally spaced radially from each other and arranged on an arc about the axis of the bearings 59.

The bearings 59 and 60 are in alignment and a shaft 63 journals in and is supported by these bearings. Mounted rigidly on the bracket 58 is the housing 64 of a multiple counter circuit switch 65 (Fig. 6). This switch has a plate 66 on which are mounted a continuous arcuate contact 67 and eleven individual terminals 68 the latter being equally spaced arcuately about the axis of the bearing 60. The radial spacing of the terminals 68 is equal to that of the detents 62 on the dial 61 at the opposite end of the shaft 63. The end of this shaft extends into the housing 64 and the hub of a switch arm 69 fits over and is rigidly secured to this end of the shaft 63 as shown in Figs. 2 and 6.

The opposite end of the shaft 63 has a key 75 and is provided with a head 76. Fitting around the shaft 63 where this extends forwardly through the bearings 59 is a selector knob 77 this having a key way 78 which receives the key 75 to prevent rotation of the knob 77 on the shaft 63.

The knob is counterbored to receive a spring 80 and is recounterbored to receive the head 76 of the shaft 63 and to permit a limited degree of movement outwardly of the knob 77 from its inwardmost position as shown in Fig. 2. A coil spring 80 is disposed about the shaft 63 in the aforementioned counterbore of the knob 77. This spring urges the knob 77 inwardly. An arm 83 on the knob carries a detent 84 which is urged by the spring 80 into any of the recesses 62 which this detent is opposite when the knob is released. When the detent 84 is thus positioned it substantially prevents rotation of the shaft 63.

Freely rotatable on the shaft 63 (Fig. 2) is a sleeve 88 having chain and sprocket housings 89 and 90 rigidly secured to opposite ends thereof. These housings have bearings 91 (Figs. 1 and 5) having elliptical bores 92 which are in alignment with each other. Each bearing 91 has an opening 93 for receiving a ball 94 which is continuously urged inwardly by the spring 95 mounted on a flange 96 provided on that particular housing.

Journalled in the bearings 91 and maintained in one side of the elliptical bores 92 by the pressure of the balls 94 thereagainst are shafts 97 and 98, the shaft 97 having a bore 99 adapted to receive a spindle 100 formed on the adjacent end of the shaft 98 thereby permitting the shafts 97 and 98 free rotation relative to each other but maintaining them in alignment.

Shaft 97 has fixed thereupon a compound printing die 105 having a plurality of printing faces 106 provided on its periphery, these faces carrying type adapted to print the size indicating numbers appearing on the dial 61 and arranged in the same sequence as these numbers. Fixed on the shaft 97 where this extends into the housing 89 is a small sprocket 110 while in radial alignment with this sprocket and fixed on the shaft 63 is a large sprocket 111. Snugly encircling these sprockets 110 and 111 is a chain 112 which transmits any rotation of the shaft 63 to the shaft 97 so that the type face 106 of the compound die 105 which is presented upwardly is that which is adapted to print a size indicating number like that opposite the detent recess 62 in which the detent member 84 is at that time lodged.

Formed on the shaft 98 is an annular groove 115 and a pair of detent recesses 116. Surrounding the shaft 98 so as to cover the channel 115 and recesses 116 is a species stamping die 117 having two printing faces 118 and 119 disposed equal distances from the axis of the shaft 98 and directly opposite from each other. Secured to the die 117 by a screw 120 which extends into the channel 115 is a spring 121 the opposite end of which overlies a hole 122 in which reposes a detent ball 123 which is held by the spring 121 in one or the other of the detent recesses 116, this determining which of the faces 118 or 119 is disposed upwardly when the parts of the device are positioned as shown in Fig. 1. Where the invention is to be used in the citrus industry for lidding, stamping and counting boxes of oranges, face 118 carries a die for printing the word "navel" while the face 119 carries a die for printing the word "Valencia".

Fixed upon the shaft 98 is a mandrel 125 on which a battery of number type rings 126 are carried. In the preferred embodiment there are four of these rings each carrying type for printing ten numerals, the mandrel 125 having detent balls 127 for holding the rings 126 with any desired group of the number printing faces thereof disposed upwardly with the mechanism positioned as shown in Fig. 1.

Fixed upon the end of the shaft 98 which extends into the housing 90 is a small sprocket 135. Rotatably supported on a shaft 63 in the housing 90 is a large sprocket 136 which is rotatably united with the sprocket 135 by a chain 137 snugly trained about these sprockets. Sprocket 136 has an arm 138 extending upwardly from the hub thereof which arm is held in upright position throughout the operation of the machine by a rod 139 extending from this arm to an adjacent corner post 17 as shown in Fig. 1. Thus while the shaft 63 is freely rotatable in the sprocket 136 that sprocket is held at all times against rotation relative to the frame 16 of the machine.

Rotatably supported on the shaft 63 between the bearing 16 and the sprocket 136 is a sleeve 140 having an arm 141 which is fixed by a spacer 142 to the housing 90 (see Figs. 1, 2, and 3) and an arm 145 (see Figs. 7, 8, and 9) which extends inwardly and downwardly from this sleeve.

Rigidly fixed on the slide member 31 of the chuck beam 29 as shown in Fig. 1 is an arm 150 having an aperture 151 in the outer end thereof. Pivotally connected at its lower end with the arm 141 and extending upwardly through the opening 151 of the arm 150 is a rod 152 having collars 153 and 154 provided thereon respectively below and above the arm 150.

Mounted on the same corner post 17 that has the link 139 (Figs. 1, 7, 8, and 9) and just above the lowermost position of the table 48 is a bell crank supporting arm 160 having pivotally supported at the inner extremity thereof a bell crank 161, the inner point 162 of which is rounded. Connecting the inner end of the bell crank 161 with the lower end of the lever arm 145 is a link 165 which is constantly drawn downwardly by an extension spring 166 stretched between this link and the frame of the machine.

Fixed upon the nailing table 48 is a plate 170 having an arm 171 pivoted thereon at 172. Extending outwardly from the upper edge of the plate 170 is a lug 173 having a threaded aperture therein into which a stop screw 174 is screwed so that the head thereof is in line with the arm 171 when this is flung upward. Yieldably holding the arm 171 upwardly is a contractile spring 176. The free end of the arm 171 has a rounded head 177 the purpose of which will be made evident hereinafter. The effect of the spring 166 on the link 165 is to swing the sleeve 140, arm 141 and with this the housings 89 and 90 and sleeve 88 and all the parts supported thereon into the position in which these are shown in Figs. 1, 2, 3, and 7. The upward movement at this time of the parts assembled on the housings 89 and 90 is limited by engagement of the collar 153 with the rigid arm 150. Mounted on two of the corner posts 17 (Figs. 3 and 7) by bolts 180 so as to be slightly spaced upwardly from the type of the printing mechanism when the collar 153 engages the arm 150 as above indicated, is an ink pad 181.

In Fig. 1 it will be noted that there is mounted on the side plates 19 just above the brackets 57 a grade selecting switch 184 having a selecting knob 185 by which a switch arm 186 may be turned to indicate grade A or grade B.

Referring now particularly to Fig. 10 it will be noted that I have provided an electrically controlled counter 190 for each of the sizes of fruit indicated on the dial 61 and for each of the grades of fruit indicated on the switch 184.

Each of the counters 190 has two terminals, and one of these terminals of each of the counters is connected to the corresponding terminal of the switch 65 which is connected to the terminal 67 of this switch by the contact arm 69 when the detent 84 indicates the size of fruit which that particular counter is counting. The other terminals of all the counters 190, which are for counting boxes of fruit containing grade A fruit, are connected to terminal A of the switch 184 while the other terminals of all the counters which are for counting boxes containing grade B fruit are connected to the terminal B of the switch 184. A source of electricity such as battery 192 is provided one terminal of which is connected to the post of the switch arm 186 of the switch 184. The other terminal of the battery 192 is connected through a switch 193 to the contact terminal 67 of the switch 65. As will be seen in Figs. 7, 8, and 9 the switch 193 is mounted on the same corner post 17 as the arm 160 and has a switch arm 194 which extends into the path of a pin 195 provided on the nailing table 48. The arm 194 is adapted to be engaged by this pin in the upward travel of the table as shown in Fig. 8 so as to close the switch 193 and complete that circuit of electricity from the battery 192 through one of the counters 190 depending upon the setting of the switches 65 and 184 which determine which counter that circuit will pass through.

Operation

As the box is rolled into the machine 15 onto the nailing table 48 the operator observes the brand indicated by the label on the end of the box or on the wrappers of the fruit or both, which indicates to him whether or not the fruit in the box is of grade A or grade B. He then sets the switch 184 to indicate this grade. At the same time he notes the geometrical formation of the fruit in the pack as this appears in the upper layers thereof and this informs him exactly what size of fruit is in the box B. He then pulls out the knob 77 and sets the arm 83 with the detent member 84 in the recess 62 opposite the number indicating the size of the fruit in box B. The setting of this hand necessarily rotates the shaft 63 and this operates through the sprockets 110 and 111 and the chain 112 to rotate the shaft 97 and turn the compound die 105 to bring the type thereon uppermost which is adapted to print the number indicating this size of fruit. Assuming that the box B is the first box of a given run of fruit the operator will also see that the type face 118 or 119 is uppermost whichever correctly indicates the species of fruit in the lot. At the same time he will also adjust the type rings 126 on the mandrel 125 so that the first two digits of the number to be printed by the type faces disposed uppermost thereon indicate respectively the day and month of the year during which the packing is taking place and the last digit will indicate the number of the lot of fruit of which box B is the first to be packed.

It will be noted of course that the operator's part in accomplishing the setting of the mechanism merely amounts to the observation of the grade and size of fruit in the box and the setting of the indicating knobs 185 and 77 to correctly indicate this grade and size. Having done this the operator continues to operate the lidding machine in the usual manner, which is to step on a pedal controlling the elevator mechanism which elevates the table 48 as hereinbefore described to accomplish the lidding of the box B. As the table moves upwardly the rounded head 177 of the arm 171 on the table 48 engages the bell crank 161 and idly passes over this bell crank owing to the stretching of the spring 176. After the lid L has been pressed against the ends of the box B by engagement with the chucks on the chuck beam 29 this chuck beam is lifted as before described in accomplishing the nailing of the lid to the box and during the final portion of the latter movement the arm 150 is elevated until it engages the collar 154 on the rod 152 and lifts on the arm 141 thus rocking the stamping mechanism assembly upward and bringing the type faces upwardly disposed thereon against the ink pad 181 as shown in Fig. 8.

As soon as the nailing of the lid to the box has been accomplished by the machine the operator removes his foot from the control pedal allowing the table 48 to return rapidly downwardly to its original position as shown in Fig. 7. While the table is thus moving downwardly the rounded end 177 of the arm 171 engages the bell crank 161 which pushes upwardly on the link 165 and rocks the lever arm 145 upwardly as shown in Fig. 9. This rotates the sleeve 140 and with it the housings 89 and 90 and the stamping mechanism mounted thereon. Owing to the fact the sprockets 110 and 135 are of equal diameters and are smaller than the sprockets 111 and 136 (which latter two are also of equal diameters) the various type members on the shafts 97 and 98 are given a planetary rotation about the axis of these shafts so when the stamping mechanism is positioned as shown in Fig. 9 the type faces which were inked as shown in Fig. 8 are now tangent with the vertical end face of the box B so as to stamp or print upon the box indicia corresponding to this type. This indicia of course is disposed in a horizontal line along the upper edge of the box. At the time the printing occurs there is of course a certain degree of relative vertical movement between the box itself and the type and to prevent smearing, the printing action is made to take place suddenly by the nature of the contact between the pointed end 162 of the bell crank 161 and the rounded end 177 of the lever 171.

A machine exactly as shown herein has been built and thoroughly tested and when the same box was put through the machine several times the type reprinted the same indicia over identically the same area on the box and without any blurring so that after the last of these reprintings it was not possible by ordinary observation to distinguish between the appearance of the printed indicia on this box and indicia which had been printed but once. The remarkable thing about this was that standard type faces 106 were used which have some relatively fine type disposed both before and after each fruit size indicating number and the indicia printed repeatedly over the same area by this fine type was likewise indistinguishable from an indicia made by a single printing thereof.

The operator habitually sets the switch 184 to indicate the grade of fruit in the box being lidded before setting the stamping mechanism. Furthermore he is always careful to have the indicating arm 83 set to correctly indicate the size of fruit in the box being lidded before the nailing of the lid ends to the box takes place as otherwise the type face 106 which corresponds to this size would not be disposed upwardly and it would therefore not be inked when the stamper assembly is rocked upward against ink pad 181 as shown in Fig. 8. This being the case the correct counter 190 is always energized when the switch 193 is closed at the upwardmost point of travel of the nailing table 17. This assures a correct count being kept by the counters 190 of all boxes passing through the machine both as to size and grade.

What I claim is:

1. In a lidding machine, the combination of: a frame; a table for receiving a box; an overhead structure supported on said frame and overlying said table and said box; means for causing relative vertical movement between said table and said overhead structure to lid said box; a stamping mechanism mounted on said overhead structure; and means responsive to said relative vertical movement for actuating said stamping mechanism to stamp an indicia upon an end of said box during said lidding operation.

2. In a lidding machine, the combination of: a frame; a table for receiving a box; an overhead structure supported on said frame and overlying said table and said box; means for causing relative vertical movement between said table and said overhead structure to lid said box; a stamping mechanism mounted on said overhead structure over the path of a box passing onto or from said table; and means responsive to said relative vertical movement for actuating said stamping mechanism to stamp an indicia upon an end of said box during said lidding operation.

3. A combination as in claim 1 in which inking means is provided; and means for actuating said inking means to ink said stamping mechanism incidental to the approaching phase of said relative movement.

4. A combination as in claim 1 in which inking means is provided; and means for actuating said inking means to ink said stamping mechanism incidental to the approaching phase of said relative movement, the actuation of said stamping mechanism to stamp said indicia on said box being in response to the separating phase of said relative movement.

5. A combination as in claim 1 in which said actuation of said stamping mechanism is with a snap motion, the printing of said mechanism on said box occurring during relative vertical movement between said box and said mechanism.

6. A combination as in claim 1 in which said stamping mechanism has means for printing a plurality of indicia each denoting a particular size of fruit; and control means on said structure substantially on a level with the eyes of the operator of said machine by which the operator may selectively predetermine the stamping of an indicia on said box which denotes the size of fruit in said box.

7. A combination as in claim 1 in which said stamping mechanism has means for printing a plurality of indicia each denoting a particular size of fruit; and control means on said structure substantially on a level with the eyes of the operator of said machine by which the operator may selectively predetermine the stamping of an indicia on said box which denotes the size of fruit in said box; and counting means for recording the number of boxes of each such sizes of fruit which are lidded in said machine.

8. In a lidding machine the combination of: a frame; a table for receiving a box; an overhead structure supported on said frame and overlying said table and said box; means for causing relative vertical movement between said table and said overhead structure to lid said box; electroresponsive means for registering the number of boxes containing each of a plurality of sizes of fruit and lidded in said machine; visual indicating means accessible to the operator of said machine during the operation of the latter by which he may selectively indicate the size of fruit in each box when it enters said machine to be lidded; an electric system including a source of power and responsive to said indicating means to establish a circuit which when closed will cause said registering means to count said box in the correct classification shown on said indicating means; and a circuit closer responsive to said relative vertical movement to close the circuit thus set up in said system.

9. In a lidding machine the combination of: a frame; a table for receiving a box; an overhead structure supported on said frame and overlying said table and said box; means for causing relative vertical movement between said table and said overhead structure to lid said box; electroresponsive means for registering the number of boxes containing each of a plurality of sizes of fruit and lidded in said machine; visual indicating means accessible to the operator of said machine during the operation thereof by which he may selectively indicate the size of fruit in each box when it enters said machine to be lidded; and means responsive to said relative vertical movement to energize said registering means to count the box then in said machine in the correct fruit size classification shown on said indicating means.

10. In a lidding machine the combination of: a frame; a table for receiving a box; an overhead structure supported on said frame and overlying said table and said box; means for causing relative vertical movement between said table and said overhead structure to lid said box; means for stamping selected indicia on a box being lidded in said machine said indicia denoting the size of fruit in said box; visual indicating means accessible to the operator of said machine during the operation of the latter by which he may selectively indicate the size of fruit in each box when it enters said machine to be lidded; means responsive to said visual indicating means for setting said stamping mechanism in readiness to print indicia in accordance with the showing of said visual indicating means; and means responsive to said relative vertical movement to actuate said stamping means to stamp the last aforementioned indicia on the box then in said machine to show the size of fruit in said box as indicated by said visual indicating means.

11. In a lidding machine the combination of: a frame; a table for receiving a box; an overhead structure supported on said frame and overlying said table and said box; means for causing relative vertical movement between said table and said overhead structure to lid said box; means for stamping selected indicia on a box being lidded in said machine said indicia denoting the size of fruit in said box; visual indicating means accessible to the operator of said machine during the operation thereof by which he may selectively indicate the size of fruit in each box when it enters said machine to be lidded; means responsive to said visual indicating means for setting said stamping mechanism in readiness to print indicia in accordance with the showing of said visual indicating means; means responsive to said relative vertical movement to actuate said stamping means to stamp the last aforementioned indicia on the box then in said machine to show the size of fruit in said box as indicated by said visual indicating means; means for registering the number of boxes containing each of said sizes of fruit and lidded in said machines; and means responsive to said visual indicating means and said relative vertical movement to actuate said registering means to count the box then in said machine in the correct fruit size classification shown by said indicating means.

12. In a lidding machine, the combination of: a frame; a table for receiving a box; an overhead structure supported on said frame and overlying said table and said box; means for causing relative vertical movement between said table and said overhead structure to lid said box; there being a free path for movement of boxes along their longitudinal axes onto and from said table; stamping means pivotally mounted on a horizontal axis disposed above said path at one end of said machine; and means responsive to said relative vertical movement for swinging said stamping means downward about said axis to stamp an indicia on a box being lidded in said machine.

13. In a lidding machine, the combination of: a frame; a table for receiving a box; an overhead structure supported on said frame and overlying said table and said box; means for causing relative vertical movement between said table and said overhead structure to lid said box, there being a free path for movement of boxes along their longitudinal axes onto and from said table; stamping means pivotally mounted on a horizontal axis disposed above said path at one end of said machine; and means for swinging said stamping means downward about said axis to stamp an indicia on a box being lidded in said machine.

14. In a lidding machine, the combination of: a frame; a table for receiving a box; an overhead structure supported on said frame and overlying said table and said box; means for causing relative vertical movement between said table and said overhead structure to lid said box, there being a free path for movement of boxes along their longitudinal axes onto and from said table; stamping means pivotally mounted on a horizontal axis disposed above said path at one end of said machine; means for swinging said stamping means downward about said axis to stamp an indicia on a box being lidded in said machine; an ink pad disposed above said stamping means; means for applying said ink pad to an upwardly disposed face of said stamping means; and means for automatically rotating said stamping means, during the aforesaid swinging thereof about said axis, to bring said inked face into printing engagement with a vertical end surface of said box.

15. In a lidding machine, the combination of: a frame; a table for receiving a box; an overhead structure supported on said frame and overlying said table and said box; means for causing relative vertical movement between said table and said overhead structure to lid said box; a stamping means rotatable on its own axis and swingably mounted about an axis parallel with and eccentric to the aforesaid axis; an ink pad in a relatively remote position; means for rotating said stamping means about said eccentric axis to bring a given face of said stamping means into printing relation with a vertical end surface on a box in said lidder; and means causing planetary rotation of said stamping means about its own axis during said swinging movement to present in said printing relation a face which before such swinging was disposed adjacent said ink pad.

16. A combination as in claim 13 in which said stamping means has a plurality of stamping faces bearing different indicia; and means rotatable on said horizontal axis for selectively predetermining which of said faces is to be used in stamping said indicia on said box.

17. In combination: a frame; a table supported on said frame for receiving a box conveyed thereto; means on said table for giving said box a predetermined position thereon; an overhead structure supported on said frame; a stamping mechanism mounted on said overhead structure; means for causing relative vertical movement between said table and said overhead structure; and means operated by said relative movement means to actuate said stamping mechanism to stamp an indicia upon an end of said box.

18. In combination: a frame; a table supported on said frame for receiving a box conveyed thereto; means on said table for giving said box a predetermined position thereon; an overhead structure supported on said frame; a stamping mechanism mounted on said overhead structure; means for causing relative vertical movement between said table and said overhead structure; and means operated by said relative movement means to actuate said stamping mechanism during said relative vertical movement to stamp an indicia upon an end of said box.

19. A combination as in claim 17, in which said stamping mechanism is mounted on said overhead structure so as to be rotatable about a horizontal axis to perform its indicia stamping operation as aforesaid.

20. A combination as in claim 18, in which said stamping mechanism is actuated with a snap action permitting only a very brief contact of said mechanism with the box in performing its indicia stamping function.

21. In combination: a table for receiving each of a series of boxes individually and consecutively delivered to said table, the contents of said boxes varying in character; a stamping mechanism adapted to stamp upon each box an indicia designating the character of the contents of said box; means for setting said stamping mechanism with respect to each individual box to prepare said mechanism for stamping the proper indicia thereon; register means for totalling separately the different kinds of stamping operations performed by said stamping mechanism; and means controlled by the performance of each indicia printing operation of said stamping mechanism to actuate said register means to cause the latter to register said indicia printing operation in its proper classification.

22. In combination: a frame; a conveyor table on said frame adapted to have a box conveyed horizontally onto said table, positioned thereon while being worked upon, and then discharged horizontally from said table; means for working on said box while latter is disposed on said table; means for positioning said box on said table to permit said box to be worked upon by said working means; an overhead structure provided on said frame; a stamping mechanism; means for supporting said stamping mechanism on said overhead structure above the path taken by said box when traveling to and from said table; and means responsive to the operation of said working means for actuating said stamping mechanism to cause the latter to perform its indicia stamping function as aforesaid.

HALE PAXTON.